United States Patent
Shike et al.

(10) Patent No.: US 11,250,623 B2
(45) Date of Patent: Feb. 15, 2022

(54) TOPOGRAPHIC INFORMATION TRANSMISSION DEVICE, CONSTRUCTION MANAGEMENT SYSTEM, AND TOPOGRAPHIC INFORMATION TRANSMISSION METHOD

(71) Applicant: Komatsu Ltd., Tokyo (JP)

(72) Inventors: Chikashi Shike, Tokyo (JP); Yoshiyuki Onishi, Tokyo (JP); Mitsuhiro Aoki, Tokyo (JP)

(73) Assignee: Komatsu Ltd., Tokyo (JP)

( * ) Notice: Subject to any disclaimer, the term of this patent is extended or adjusted under 35 U.S.C. 154(b) by 87 days.

(21) Appl. No.: 16/605,256

(22) PCT Filed: Jun. 27, 2018

(86) PCT No.: PCT/JP2018/024338
§ 371 (c)(1),
(2) Date: Oct. 15, 2019

(87) PCT Pub. No.: WO2019/012988
PCT Pub. Date: Jan. 17, 2019

(65) Prior Publication Data
US 2021/0142557 A1    May 13, 2021

(30) Foreign Application Priority Data
Jul. 14, 2017 (JP) .............................. JP2017-138417

(51) Int. Cl.
*G06T 17/00* (2006.01)
*G06T 17/05* (2011.01)
(Continued)

(52) U.S. Cl.
CPC ............ *G06T 17/05* (2013.01); *B64C 39/024* (2013.01); *E02F 9/261* (2013.01);
(Continued)

(58) Field of Classification Search
None
See application file for complete search history.

(56) References Cited

U.S. PATENT DOCUMENTS 8,773,512 B1 * 7/2014 Rafii ...................... G02B 5/124
348/47
2002/0123969 A1 * 9/2002 Foertsch ............ G06Q 10/0631
705/63

(Continued)

FOREIGN PATENT DOCUMENTS

JP    2001-243500 A    9/2001
JP    2007-170820 A    7/2007
(Continued)

*Primary Examiner* — Martin Mushambo
(74) *Attorney, Agent, or Firm* — Locke Lord LLP (57) ABSTRACT

A topographic information transmission device which is provided in a construction site includes an image data reception unit that receives a plurality of pieces of image data in which a landform of the construction site is captured, a three-dimensional data creation unit that creates three-dimensional data of the construction site on the basis of the plurality of pieces of image data, an amount-reduction processing unit that performs an amount reduction process of reducing a total data amount of the created three-dimensional data, and a topographic information transmission unit that transmits amount-reduced three-dimensional data having undergone the amount reduction process to an information providing device.

18 Claims, 5 Drawing Sheets

(51) Int. Cl.
  *B64C 39/02* (2006.01)
  *E02F 9/26* (2006.01)
  *H04N 13/204* (2018.01)

(52) U.S. Cl.
  CPC .. *B64C 2201/027* (2013.01); *B64C 2201/123* (2013.01); *G06T 2200/04* (2013.01); *H04N 13/204* (2018.05)

(56) References Cited

U.S. PATENT DOCUMENTS

| | | | | |
|---|---|---|---|---|
| 2012/0101796 | A1* | 4/2012 | Lindores | G06F 16/29 703/9 |
| 2013/0249901 | A1* | 9/2013 | Sweet | G06T 17/00 345/419 |
| 2017/0136962 | A1* | 5/2017 | Morita | B60K 35/00 |
| 2018/0218304 | A1 | 8/2018 | Shike | |
| 2019/0033459 | A1* | 1/2019 | Tisdale | G06K 9/00791 |

FOREIGN PATENT DOCUMENTS

| | | | | |
|---|---|---|---|---|
| JP | 2013-036243 A | | 2/2013 | |
| WO | WO-2013170348 A1 | * | 11/2013 | ........... H04N 13/239 |
| WO | 2017/061517 A1 | | 4/2017 | |

* cited by examiner

TOPOGRAPHIC INFORMATION TRANSMISSION DEVICE, CONSTRUCTION MANAGEMENT SYSTEM, AND TOPOGRAPHIC INFORMATION TRANSMISSION METHOD

TECHNICAL FIELD

The present invention relates to a topographic information transmission device, a construction management system, and a topographic information transmission method.

Priority is claimed on Japanese Patent Application No. 2017-138417, filed on Jul. 14, 2017, the content of which is incorporated herein by reference.

BACKGROUND ART

As disclosed in PTL 1, there is a technique in which image data of a construction site is acquired by using a stereo camera provided in a construction machine, and three-dimensional data is created by using the image data. Three-dimensional data of a landform of a construction site is created, and thus the process of the construction site can be managed.

There is a method in which a small aircraft (drone) mounted with a stereo camera is navigated to capture images of a landform of the entire construction site, and three-dimensional data indicating the landform of the entire construction site is created.

CITATION LIST

Patent Literature

[PTL 1] Japanese Unexamined Patent Application, First Publication No. 2013-036243

SUMMARY OF INVENTION

Technical Problem

The small aircraft thoroughly captures images of the landform while being navigated over the construction site, and transmits a plurality of pieces of image data acquired through capturing images, to a server device (information providing device) via a wide area network. The server device creates three-dimensional data (partial landform three-dimensional data) included in each of the plurality of received pieces of image data, and integrates the partial three-dimensional data to create three-dimensional data (entire landform three-dimensional data) indicating the landform of the entire construction site. The server device processes the entire landform three-dimensional data into a state of being viewable via a wide area network (Internet). Consequently, a worker or a manager related to construction can check a three-dimensional shape of the entire construction site via the wide area network by using an output device.

However, in the image data obtained through capturing images, a volume of a single piece of data is large, and a total number of pieces of image data required for a single construction site is enormous. Thus, a lot of time is required to transmit all of an enormous number of pieces of image data transmitted from the small aircraft via the wide area network. The server device receives image data from each of a plurality of construction sites, and performs a process of creating three-dimensional data in parallel on the image data. Thus, the process in the server device imposes a high load.

Due to the above circumstances, a lot of time is required to complete three-dimensional data (entire landform three-dimensional data) of the entire construction site from starting of capturing images in the small aircraft in a single construction site. Therefore, the entire landform three-dimensional data cannot be updated at a relatively short time interval (for example, a day unit), and thus it is hard to understand construction progress in detail.

The present invention has been made in order to solve the problems, and an object thereof is to provide a topographic information transmission device, a construction management system, and a topographic information transmission method capable of improving an update frequency of three-dimensional data of the entire construction site.

Solution to Problem

According to a first aspect of the present invention, there is provided a topographic information transmission device which is provided in a construction site and transmits three-dimensional data indicating a landform of the construction site to a server device, the topographic information transmission device including an image data reception unit that receives a plurality of pieces of image data in which the landform of the construction site is captured; a three-dimensional data creation unit that creates three-dimensional data of the construction site on the basis of the plurality of pieces of image data; an amount-reduction processing unit that performs an amount reduction process of reducing a total data amount of the created three-dimensional data; and a topographic information transmission unit that transmits amount-reduced three-dimensional data having undergone the amount reduction process to the server device.

Advantageous Effects of Invention

According to at least one of the aspects, it is possible to improve an update frequency of three-dimensional data of the entire construction site.

DESCRIPTION OF EMBODIMENTS

First Embodiment (Overall Configuration of Construction Management System)

Figure 1:
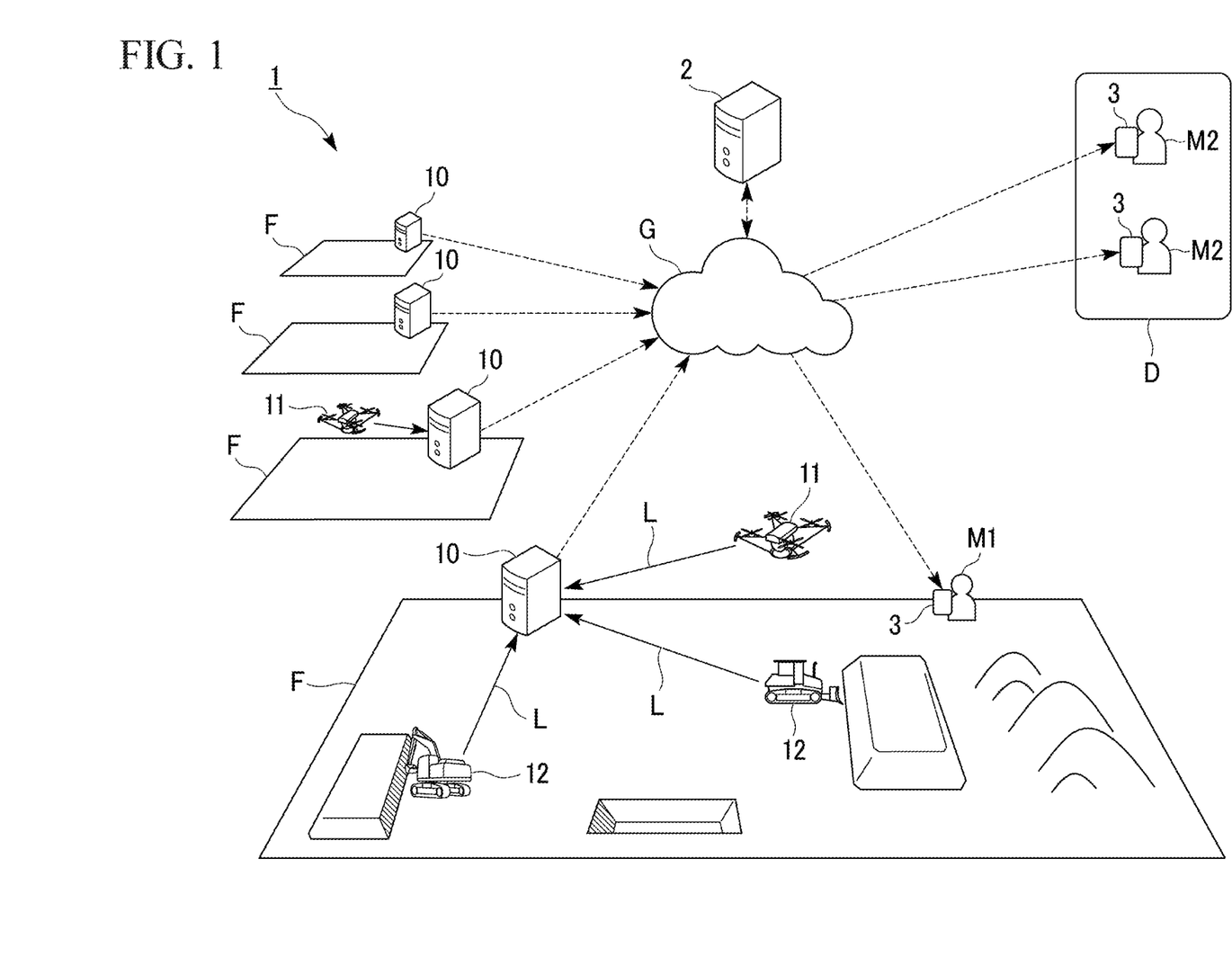
FIG. 1 is a schematic diagram illustrating the overall configuration of a construction management system according to a first embodiment.

FIG. 1 is a schematic diagram illustrating the overall configuration of a construction management system according to a first embodiment.

As illustrated in FIG. 1, a construction management system 1 includes topographic information transmission devices 10, a small aircraft 11 (drone), construction machines 12, an information providing device 2, and output devices 3.

The topographic information transmission devices 10 are computers respectively provided in site offices installed in construction sites F. The topographic information transmission devices 10 are respectively provided in a plurality of construction sites F, and transmit topographic information indicating landforms of the construction sites F to the information providing device 2 which is a server device via a wide area network G. The wide area network G is a so-called Internet communication network or a mobile communication network such as LTE/3G.

The topographic information transmission device 10 is communicably connected to the small aircraft 11 and the construction machines 12 which will be described later via an in-site communication network L. The in-site communication network L is a wireless communication network via which devices (the topographic information transmission devices 10, the small aircraft 11, and the construction machines 12) present in a single construction site F can exchange information with each other. In the present embodiment, it is assumed that the topographic information transmission device 10 provided in the construction site F performs peer-to-peer (P2P) communication using a "wireless LAN" with moving objects (the small aircraft 11 and the construction machines 12) in the construction site F.

The small aircraft 11 is an imaging device mounted with, for example, a stereo camera (not illustrated in FIG. 1) and is navigated along a predefined route over a single construction site F. The small aircraft 11 thoroughly captures images of the entire landform of the construction site F with the stereo camera, so as to generate a plurality of pieces of image data. The landform of the construction site F is partially captured in each piece of image data.

The small aircraft 11 transmits the plurality of pieces of acquired image data to the topographic information transmission device 10 via the wireless LAN.

The construction machines 12 are, for example, a hydraulic excavator and a bulldozer, and are a plurality of construction machines performing construction work in the construction site F. In the present embodiment, the construction machine 12 is also mounted with an imaging device (not illustrated in FIG. 1), and captures images of the landform in response to, for example, a driver's operation.

The construction machine 12 transmits the image data acquired through capturing images to the topographic information transmission device 10 via the wireless LAN.

The information providing device 2 is a server device which collects three-dimensional data from each topographic information transmission device 10 via the wide area network G, is a device which processes each piece of the three-dimensional data received to be viewable, and provides the three-dimensional data to a user via the Internet or the like. Particularly, the information providing device 2 according to the present embodiment creates progress information enabling the progress of construction work in each construction site F to be recognized on the basis of the three-dimensional data received from the topographic information transmission device 10.

The output device 3 receives information (progress information which will be described later) provided from the information providing device 2 via the wide area network G and informs the user of the information. For example, a worker M1 performing construction work in the construction site F can acquire the progress information on the spot through the output device 3 carried by the worker, for example, a tablet terminal. A manager M2 (a general manager or the like) present at a remote location D far from the construction site F can acquire the progress information through the output device 3 carried by the manager. The progress information may also be acquired to be output with a printer or the like.

(Functional Configurations of Topographic Information Transmission Device and the Like)

Figure 2:
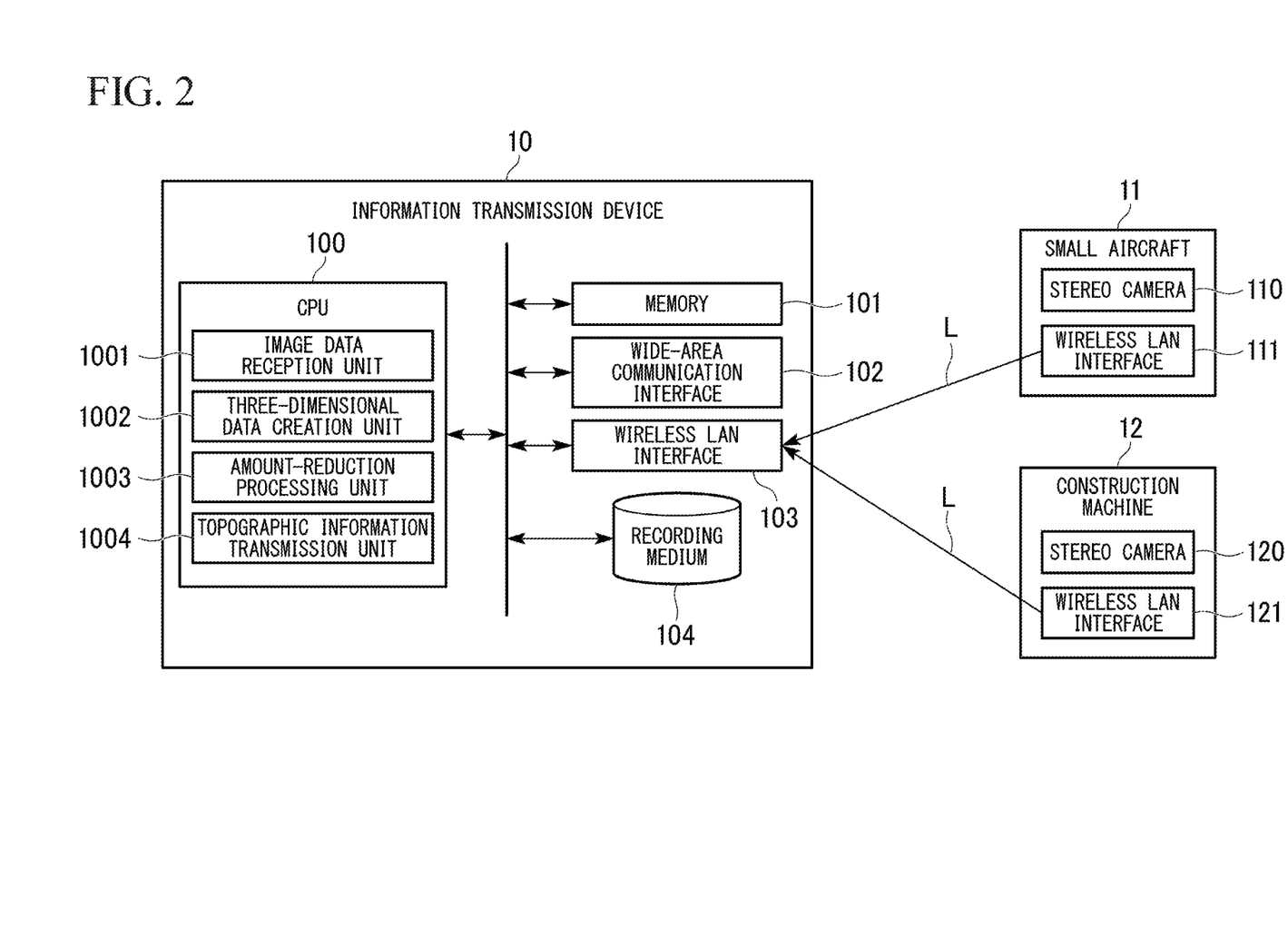
FIG. 2 is a diagram illustrating functional configurations of a topographic information transmission device and the like according to the first embodiment.

FIG. 2 is a diagram illustrating functional configurations of the topographic information transmission device and the like according to the first embodiment.

As illustrated in FIG. 2, the topographic information transmission device 10 includes a CPU 100, a memory 101, a wide area communication interface 102, a wireless LAN interface 103, and a recording medium 104.

The CPU 100 is a processor which controls overall operations of the topographic information transmission device 10. The CPU 100 reads a program or data stored on the recording medium 104 or the like to the memory 101, and executes processes defined in the program so as to realize each function which will be described later.

The memory 101 is a volatile memory (RAM) used as a work area of the CPU 100.

The wide area communication interface 102 is a connection interface used for the topographic information transmission device 10 to transmit and receive information to and from the information providing device 2 via the wide area network G. The wide area communication interface 102 may be connected to the topographic information transmission device 10 via the wide area network G in a wired or wireless manner.

The wireless LAN interface 103 is communicably connected to other various devices (the small aircraft 11 and the construction machines 12) present in the construction site F via the wireless LAN.

The recording medium 104 is realized by a large capacity recording device such as a hard disk drive (HDD) or a solid state drive (SSD), and stores an operation system (OS), an application program, and various pieces of data. In the present embodiment, a plurality of pieces of image data acquired by the small aircraft 11 or the like is recorded and preserved on the recording medium 104.

The CPU 100 operates on the basis of the program, and thus realizes functions of an image data reception unit 1001, a three-dimensional data creation unit 1002, an amount-reduction processing unit 1003, and a topographic information transmission unit 1004, illustrated in FIG. 2.

The image data reception unit 1001 receives a plurality of pieces of image data in which the landform of the construction site F is captured from moving objects (the small aircraft 11 and the construction machines 12) mounted with stereo cameras via the in-side communication network. The image data reception unit 1001 receives position/azimuth information when capturing images is performed from the moving objects performing the capturing images with the stereo cameras.

The three-dimensional data creation unit 1002 creates three-dimensional data of the landform of the construction site F on the basis of the plurality of image data acquired by the image data reception unit 1001. Specifically, the three-dimensional data creation unit 1002 performs stereo matching process on image data (stereo images) acquired a stereo camera 110 of the small aircraft 11, and creates three-dimensional data (partial landform three-dimensional data) of a landform of a portion included in the image data in the entire construction site F. The three-dimensional data creation unit 1002 joins a plurality of pieces of partial landform three-dimensional data created for the respective pieces of image data together on the basis of the position/azimuth information so as to be integrated into one, and thus creates the "entire landform three-dimensional data" indicating a landform wider than a partial landform three-dimensional data region, for example, the landform of the entire construction site F.

Examples of the three-dimensional data may include point group data, polygon data, and voxel data plotted on three-dimensional coordinates.

The amount-reduction processing unit 1003 performs an amount reduction process of reducing a total data amount of the entire landform three-dimensional data created by the three-dimensional data creation unit 1002. As a specific example of the "amount reduction process", there is a method in which a representative value (an average value, the most frequent value, or a median) of a point group is calculated for each small region (mesh) which is separate at a predetermined interval, and a point group is decimated. An example of the "amount reduction process" may include an unnecessary matter removal process of removing a singular point (having a coordinate which is greatly different from a coordinate of an adjacent point group) which occurs due to the influence of noise or the like of image data.

The topographic information transmission unit 1004 transmits "amount-reduced three-dimensional data" which is three-dimensional data having undergone the amount reduction process in the amount-reduction processing unit 1003 to the information providing device 2 via the wide area network G.

As illustrated in FIG. 2, the small aircraft 11 includes the stereo camera 110 and a wireless LAN interface 111. The small aircraft 11 captures images of a landform by using the stereo camera 110 while being automatically navigated over the construction site F according to a program which is incorporated in advance. The small aircraft 11 transmits image data acquired through capturing images to the topographic information transmission device 10 via the wireless LAN interface 111.

The construction machine 12 includes a stereo camera 120 and a wireless LAN interface 121. The construction machine 12 captures images of the landform by using the stereo camera 120 according to a driver's operation (for example, pressing of a dedicated button). The construction machine 12 transmits image data acquired through capturing images to the topographic information transmission device 10 via the wireless LAN interface 121.

(Functional Configuration of Information Providing Device)

Figure 3:
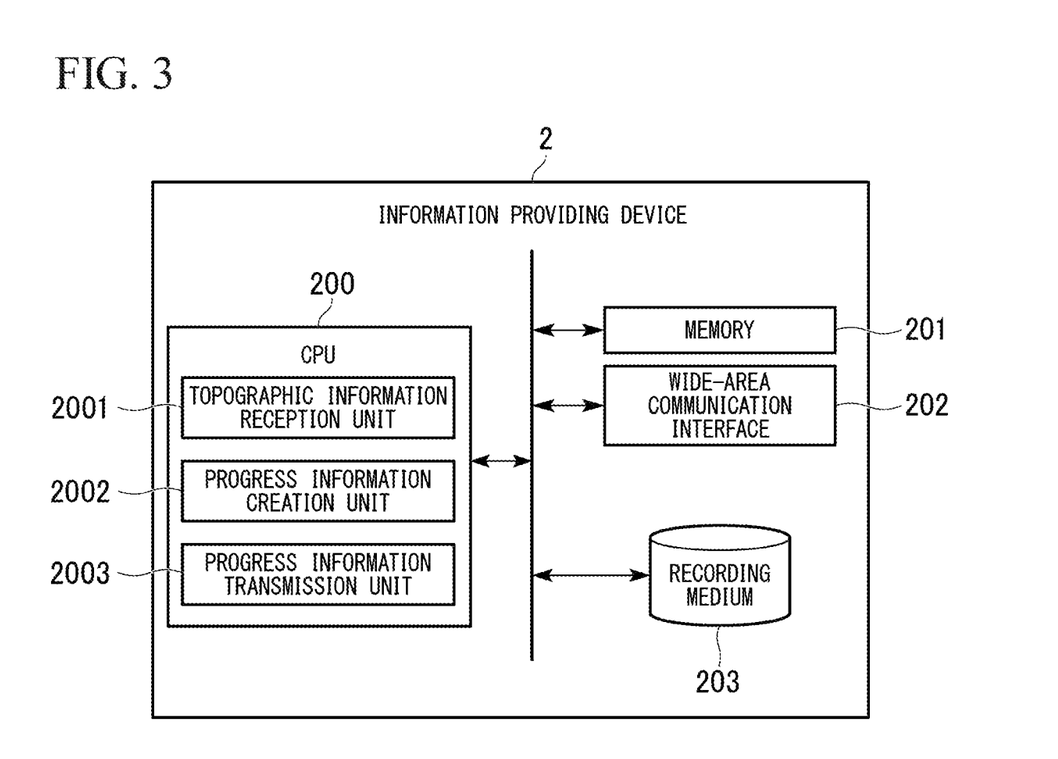
FIG. 3 is a diagram illustrating a functional configuration of an information providing device according to the first embodiment.

FIG. 3 is a diagram illustrating a functional configuration of the information providing device according to the first embodiment.

As illustrated in FIG. 3, the information providing device 2 includes a CPU 200, a memory 201, a wide area communication interface 202, and a recording medium 203.

The CPU 200 is a processor which controls overall operations of the information providing device 2. The CPU 200 reads a program or data stored on the recording medium 203 or the like to the memory 201, and executes processes defined in the program so as to realize each function which will be described later.

The memory 201 is a volatile memory (RAM) used as a work area of the CPU 200.

The wide area communication interface 202 is a connection interface used for the information providing device 2 to receive amount-reduced three-dimensional data from the plurality of topographic information transmission devices 10 via the wide area network G. The wide area communication interface 202 may be connected to the information providing device 2 via the wide area network G in a wired or wireless manner.

The recording medium 203 is realized by a large capacity recording device such as an HDD or an SSD, and stores an OS, an application program, and various pieces of data. In the present embodiment, the amount-reduced three-dimensional data or the like received from the topographic information transmission device 10 is recorded and preserved in the recording medium 203.

The CPU 200 operates on the basis of the program, and thus realizes functions of a topographic information reception unit 2001, a progress information creation unit 2002, and a progress information transmission unit 2003, illustrated in FIG. 3.

The topographic information reception unit 2001 receives amount-reduced three-dimensional data indicating the entire landform of the construction site F in which the topographic information transmission device 10 is provided, from each of the plurality of topographic information transmission device 10 via the wide area network G.

The progress information creation unit 2002 creates progress information indicating the progress of construction in the construction site F on the basis of a plurality of pieces of amount-reduced three-dimensional data received from the topographic information transmission device 10.

The progress information transmission unit 2003 transmits the progress information created by the progress information creation unit 2002 to the output device 3 of a user via the wide area network G.

(Process Flow in Topographic Information Transmission Device)

Figure 4:
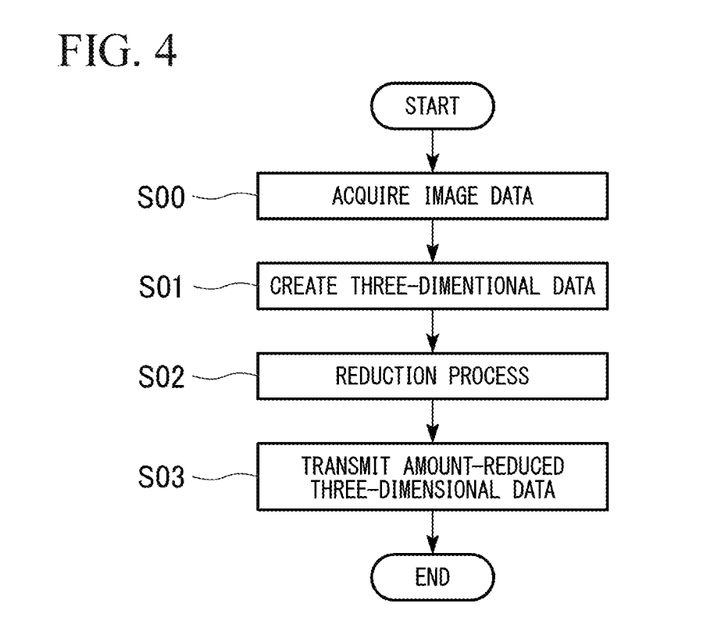
FIG. 4 is a flowchart illustrating a process flow in the topographic information transmission device according to the first embodiment.

FIG. 4 is a flowchart illustrating a process flow in the topographic information transmission device according to the first embodiment.

The process flow illustrated in FIG. 4 is periodically (for example, every day) executed, and is started after a process in which the small aircraft 11 images the entire landform of the construction site F is completed.

The image data reception unit 1001 (CPU 100) of the topographic information transmission device 10 receives a plurality of pieces of image data (and position/azimuth information) from the small aircraft 11 via the in-site communication network L (wireless LAN) (step S00). In a case where the construction machine 12 performs imaging, the image data reception unit 1001 receives image data (and position/azimuth information) from the construction machine 12 via the in-site communication network L.

Next, the three-dimensional data creation unit 1002 (CPU 100) creates three-dimensional data (entire landform three-dimensional data) of the landform of the construction site F on the basis of the plurality of image data and the position/azimuth information associated with each piece of the image data, acquired in step S00 (step S01).

Next, the amount-reduction processing unit 1003 (CPU 100) performs a reduction process of reducing a data amount of the entire landform three-dimensional data created in step S01 (step S02). Specifically, as described above, the amount-reduction processing unit 1003 performs a point group decimating process and an unnecessary matter removal process on the entire landform three-dimensional data.

Next, the topographic information transmission unit 1004 (CPU 100) transmits the amount-reduced three-dimensional data created in step S02 to the information providing device 2 via the wide area network G (step S03). In this case, the topographic information transmission unit 1004 assigns identification information for identifying the construction site F and date-and-time information (time stamp) indicating the acquisition date and time (image captured date and time) of the image data which is a basis of the three-dimensional data to the amount-reduced three-dimensional data, and transmits the amount-reduced three-dimensional data to the information providing device 2.

(Process Flow of Information Providing Device)

Figure 5:
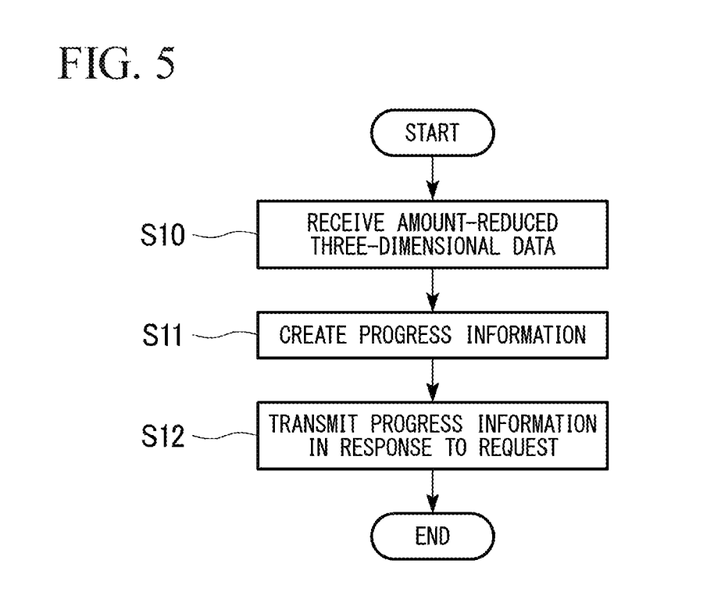
FIG. 5 is a flowchart illustrating a process flow in the information providing device according to the first embodiment.

FIG. 5 is a flowchart illustrating a process flow in the information providing device according to the first embodiment.

Figure 6:
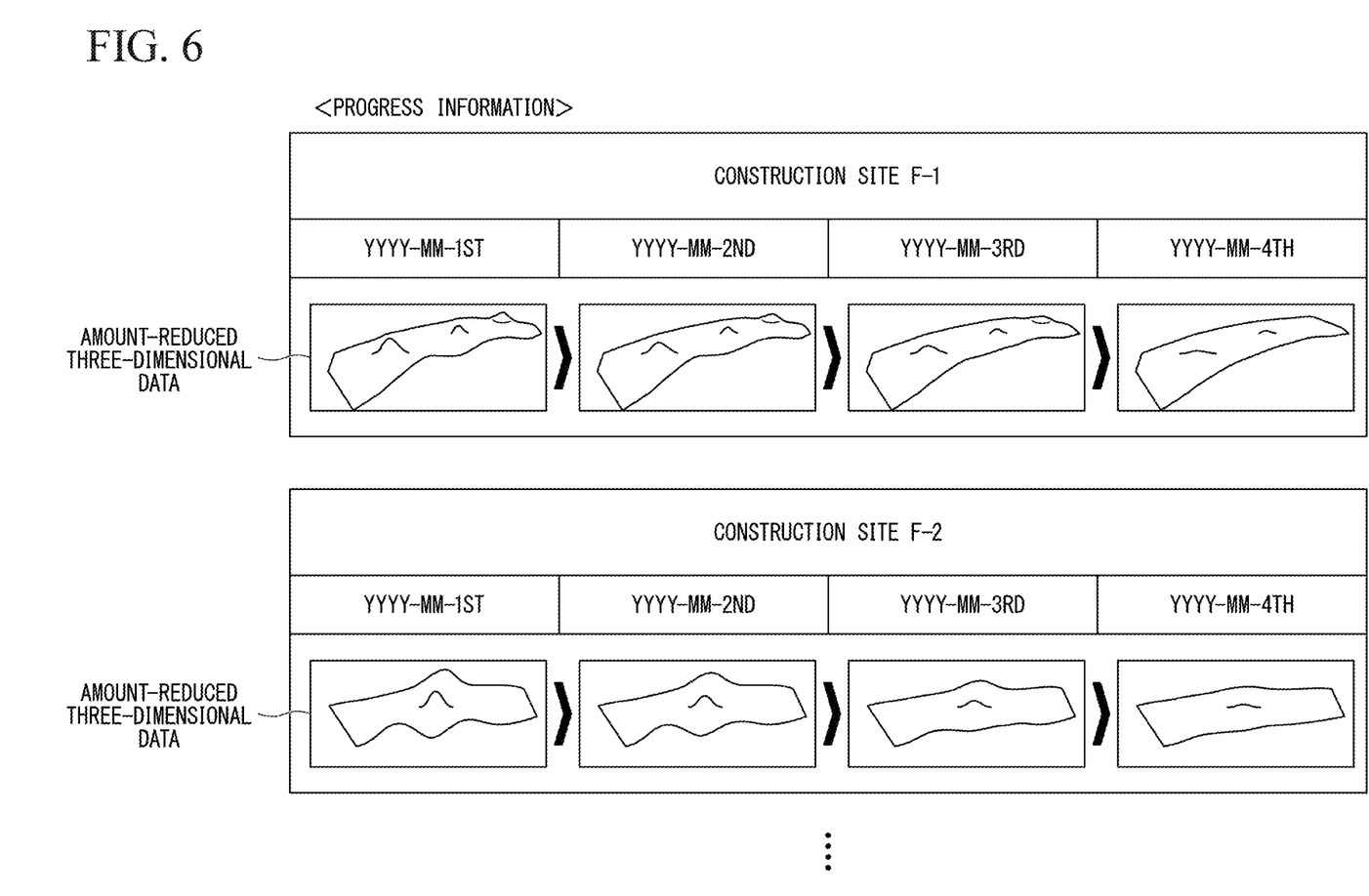
FIG. 6 is a diagram for describing a function of the information providing device according to the first embodiment.

FIG. 6 is a diagram for describing a function of the information providing device according to the first embodiment.

The process flow illustrated in FIG. 5 is periodically repeatedly executed by the CPU 200 of the information providing device 2.

The topographic information reception unit 2001 (CPU 200) of the information providing device 2 receives amount-reduced three-dimensional data or the like from each of the plurality of topographic information transmission devices 10 via the wide area network G (step S10). The amount-reduced three-dimensional data is three-dimensional data (entire landform three-dimensional data) indicating the entire landform of the construction site F in which the topographic information transmission device 10 is provided, and is data having undergone an amount reduction process in the topographic information transmission device 10.

The progress information creation unit 2002 (CPU 200) creates progress information on the basis of the amount-reduced three-dimensional data received in step S10 (step S11). Here, an example of the progress information will be described with reference to FIG. 6.

As illustrated in FIG. 6, the progress information creation unit 2002 displays the amount-reduced three-dimensional data acquired from each of the construction sites F (F-1, F-2, . . . ) in a list form in a time series. Amount-reduced three-dimensional data for a plurality of construction sites F may be displayed on an identical screen. In the above-described way, a user can finely (for example, in a cycle of one day unit) understand a change of the landform of the construction site F which is a management target. The progress information creation unit 2002 creates progress information such that the plurality of construction sites F (F-1, F-2, . . . ) are comparable with each other in the same time series. Consequently, the user can understand whether or not the progress in a certain construction site F is performed in conjunction with another construction site F.

The progress information creation unit 2002 creates the progress information as illustrated in FIG. 6 in a format (for example, an HTML format) in which the progress information is viewable on a web page or the like. The progress information creation unit 2002 creates the progress information as illustrated in FIG. 6 in a format in which the progress information is capable of output as printed matter.

The progress information transmission unit 2003 (CPU 200) transmits the progress information created in step S11 to each output device 3 in response to a viewing request from the output device 3 carried by a user (the work machine M1 or the manager M2) (step S12). Consequently, the user can check the progress information on a display panel of each output device 3 at any time.

Advantageous Effects

As described above, according to the construction management system 1 according to the first embodiment, the topographic information transmission device 10 receives a plurality of pieces of image data in which a landform of the construction site F is captured from a moving object (the small aircraft 11 or the construction machine 12) mounted with the stereo camera via the in-site communication network L (wireless LAN).

The topographic information transmission device 10 creates three-dimensional data (entire landform three-dimensional data) of the construction site F on the basis of the plurality of pieces of image data, and performs an amount reduction process of reducing a total data amount of the created three-dimensional data.

The topographic information transmission device 10 transmits amount-reduced three-dimensional data which is the entire landform three-dimensional data having undergone the amount reduction process to the server device (information providing device 2) via the wide area network G.

With the above configuration, information transmitted via the wide area network G is three-dimensional data of which a total data amount (information amount) is smaller than that of image data. The three-dimensional data is subjected to an amount reduction process, and thus a total data amount thereof is further reduced. Therefore, it is possible to reduce a communication load required to transmit topographic information data via the wide area network G. Since the server device (information providing device 2) does not need to create three-dimensional data, a load on the server device can be reduced. Consequently, the entire landform three-dimensional data of the construction site F can be updated at a relatively short time interval (for example, one day unit), and thus work progress can be understood in detail.

In addition to amount-reduced three-dimensional data, the topographic information transmission device 10 transmits date-and-time information indicating the acquisition date and time of image data which is a basis of the amount-reduced three-dimensional data to the server device (information providing device 2).

In the above-described way, the server device can create progress information in which pieces of three-dimensional data created at a predetermined time interval are arranged in a time series.

Modification Examples

As mentioned above, the construction management system 1 according to the first embodiment has been described in detail, but specific aspects of the construction management system 1 are not limited to the above aspects, and various design changes may occur within the scope without departing from the spirit.

The information providing device 2 according to the first embodiment has been described to create progress information, as illustrated in FIG. 6, in which pieces of amount-reduced three-dimensional data of each construction site F are arranged in a time series, but is not limited to this aspect in other embodiments.

The information providing device 2 according to other embodiments may specify a difference between amount-reduced three-dimensional data acquired at a certain time point and amount-reduced three-dimensional data acquired at another time point, and may create "difference three-dimensional data" obtained by visualizing the difference. In the above-described way, for example, it is possible to intuitively recognize a change of a landform of the construction site F day by day.

In the construction management system 1 according to the first embodiment, image data has been described to be acquired by the stereo cameras mounted on the small aircraft 11 and the construction machines 12, but is not limited to this aspect in other embodiments.

For example, in the construction management system 1 according to other embodiments, image data may be in an aspect of being acquired by only the small aircraft 11 or only the construction machines 12. In the construction management system 1 according to other embodiments, image data may be captured by a stereo camera mounted on a moving object (a general vehicle or a pedestrian) which is different from the small aircraft 11 and the construction machine 12, and may be captured by a stereo camera which is provided to be stationary. In other words, image data may be captured in any aspects as long as the image data is captured by an imaging device which can capture images of a landform of the construction site F.

The construction management system 1 according to the first embodiment has been described to capture images of the entire landform of the construction site F every day and transmit three-dimensional data thereof (amount-reduced three-dimensional data) to the information providing device 2, but is not limited to this aspect in other embodiments.

There may be an aspect in which the construction management system 1 according to other embodiments captures images of the entire landform of the construction site F in the unit (for example, once in each of the morning and the afternoon) shorter than one day or every hour, and transmits three-dimensional data thereof to the information providing device 2.

In the first embodiment, a description has been made of a case where the wide area network G is an Internet communication line, and the in-site communication network L is a wireless LAN, but other embodiments are not limited to this aspect. The wide area network G may be, for example, a dedicated communication line built over a plurality of construction sites F. The in-site communication network L may be in any aspects as long as apparatuses or devices present in the construction site F can perform communication with each other.

In the above-described respective embodiments, procedures of various processes in the topographic information transmission device 10 and the information providing device 2 may be stored on a computer readable recording medium in a program format, and a computer reads and executes the program so as to perform the various processes.

Examples of the computer readable recording medium include a magnetic disk, a magneto-optical disc, a CD-ROM, a DVD-ROM, and a semiconductor memory. The computer program may be delivered to the computer via a communication line, and the computer may execute the delivered program.

The program may realize some of the functions. The program may be a so-called difference file (difference program) which can realize the functions through a combination with a program which is already recorded in a computer system.

As mentioned above, several embodiments of the present invention have been described, but the embodiments are presented as only examples, and thus are not intended to limit the scope of the invention. The embodiments may be implemented in other various forms, and various omissions, alterations, and changes may occur within the scope without departing from the spirit of the invention. The embodiments or modifications thereof are included in the inventions disclosed in the claims and equivalents thereof as included in the scope and the spirit of the invention.

INDUSTRIAL APPLICABILITY

The construction management system enables an update frequency of three-dimensional data of the entire construction site to be improved.

REFERENCE SIGNS LIST

1: CONSTRUCTION MANAGEMENT SYSTEM
10: TOPOGRAPHIC INFORMATION TRANSMISSION DEVICE
100: CPU
1001: IMAGE DATA RECEPTION UNIT
1002: THREE-DIMENSIONAL DATA CREATION UNIT
1003: AMOUNT-REDUCTION PROCESSING UNIT
1004: TOPOGRAPHIC INFORMATION TRANSMISSION UNIT
101: MEMORY
102: WIDE AREA COMMUNICATION INTERFACE
103: WIRELESS LAN INTERFACE
104: RECORDING MEDIUM
11: SMALL AIRCRAFT
110: STEREO CAMERA
111: WIRELESS LAN INTERFACE
12: CONSTRUCTION MACHINE
120: STEREO CAMERA
121: WIRELESS LAN INTERFACE
2: INFORMATION PROVIDING DEVICE
200: CPU
2001: TOPOGRAPHIC INFORMATION RECEPTION UNIT
2002: PROGRESS INFORMATION CREATION UNIT
2003: PROGRESS INFORMATION TRANSMISSION UNIT
201: MEMORY
202: WIDE AREA COMMUNICATION INTERFACE
203: RECORDING MEDIUM
3: OUTPUT DEVICE

The invention claimed is:
1. A topographic information transmission device which is provided in a construction site and transmits three-dimensional data indicating a landform of the construction site to a server device, the topographic information transmission device comprising:
an image data reception unit that receives a plurality of pieces of image data in which the landform of the construction site is captured;
a three-dimensional data creation unit that creates three-dimensional data of the construction site on the basis of the plurality of pieces of image data;

an amount-reduction processing unit that performs an amount reduction process of reducing a total data amount of the created three-dimensional data; and
a topographic information transmission unit that transmits amount-reduced three-dimensional data having undergone the amount reduction process to the server device.

2. The topographic information transmission device according to claim 1,
wherein the amount reduction process is a process of decimating a point group included in the three-dimensional data.

3. The topographic information transmission device according to claim 2,
wherein the topographic information transmission unit transmits date-and-time information indicating the acquisition date and time of the image data which is a basis of the amount-reduced three-dimensional data in addition to the amount-reduced three-dimensional data.

4. The topographic information transmission device according to claim 3,
wherein the image data reception unit receives the plurality of pieces of image data along with position/azimuth information of when each piece of image data is acquired, and
wherein the three-dimensional data creation unit creates a plurality of pieces of partial landform three-dimensional data which are pieces of three-dimensional data of landforms of portions included in respective pieces of image data in the entire construction site, and then joins the plurality of pieces of created partial landform three-dimensional data together to be integrated into one on the basis of the position/azimuth information, so as to create entire landform three-dimensional data.

5. A construction management system comprising:
the topographic information transmission device according to claim 4; and
the server device,
wherein the server device includes
a progress information creation unit that creates progress information indicating progress of construction in the construction site on the basis of the amount-reduced three-dimensional data received from the topographic information transmission device; and
a progress information transmission unit that transmits the progress information to an output device of a user via a wide area network.

6. A construction management system comprising:
the topographic information transmission device according to claim 3; and
the server device,
wherein the server device includes
a progress information creation unit that creates progress information indicating progress of construction in the construction site on the basis of the amount-reduced three-dimensional data received from the topographic information transmission device; and
a progress information transmission unit that transmits the progress information to an output device of a user via a wide area network.

7. The topographic information transmission device according to claim 2,
wherein the image data reception unit receives the plurality of pieces of image data along with position/azimuth information of when each piece of image data is acquired, and
wherein the three-dimensional data creation unit creates a plurality of pieces of partial landform three-dimensional data which are pieces of three-dimensional data of landforms of portions included in respective pieces of image data in the entire construction site, and then joins the plurality of pieces of created partial landform three-dimensional data together to be integrated into one on the basis of the position/azimuth information, so as to create entire landform three-dimensional data.

8. A construction management system comprising:
the topographic information transmission device according to claim 7; and
the server device,
wherein the server device includes
a progress information creation unit that creates progress information indicating progress of construction in the construction site on the basis of the amount-reduced three-dimensional data received from the topographic information transmission device; and
a progress information transmission unit that transmits the progress information to an output device of a user via a wide area network.

9. A construction management system comprising:
the topographic information transmission device according to claim 2; and
the server device,
wherein the server device includes
a progress information creation unit that creates progress information indicating progress of construction in the construction site on the basis of the amount-reduced three-dimensional data received from the topographic information transmission device; and
a progress information transmission unit that transmits the progress information to an output device of a user via a wide area network.

10. The topographic information transmission device according to claim 1,
wherein the topographic information transmission unit transmits date-and-time information indicating the acquisition date and time of the image data which is a basis of the amount-reduced three-dimensional data in addition to the amount-reduced three-dimensional data.

11. The topographic information transmission device according to claim 10,
wherein the image data reception unit receives the plurality of pieces of image data along with position/azimuth information of when each piece of image data is acquired, and
wherein the three-dimensional data creation unit creates a plurality of pieces of partial landform three-dimensional data which are pieces of three-dimensional data of landforms of portions included in respective pieces of image data in the entire construction site, and then joins the plurality of pieces of created partial landform three-dimensional data together to be integrated into one on the basis of the position/azimuth information, so as to create entire landform three-dimensional data.

12. A construction management system comprising:
the topographic information transmission device according to claim 11; and
the server device,
wherein the server device includes
a progress information creation unit that creates progress information indicating progress of construction in the construction site on the basis of the amount-reduced three-dimensional data received from the topographic information transmission device; and a progress information transmission unit that transmits the progress information to an output device of a user via a wide area network.

13. A construction management system comprising:
the topographic information transmission device according to claim 10; and
the server device,
wherein the server device includes
a progress information creation unit that creates progress information indicating progress of construction in the construction site on the basis of the amount-reduced three-dimensional data received from the topographic information transmission device; and
a progress information transmission unit that transmits the progress information to an output device of a user via a wide area network.

14. The topographic information transmission device according claim 1,
wherein the image data reception unit receives the plurality of pieces of image data along with position/azimuth information of when each piece of image data is acquired, and
wherein the three-dimensional data creation unit creates a plurality of pieces of partial landform three-dimensional data which are pieces of three-dimensional data of landforms of portions included in respective pieces of image data in the entire construction site, and then joins the plurality of pieces of created partial landform three-dimensional data together to be integrated into one on the basis of the position/azimuth information, so as to create entire landform three-dimensional data.

15. A construction management system comprising:
the topographic information transmission device according to claim 14; and
the server device,
wherein the server device includes
a progress information creation unit that creates progress information indicating progress of construction in the construction site on the basis of the amount-reduced three-dimensional data received from the topographic information transmission device; and
a progress information transmission unit that transmits the progress information to an output device of a user via a wide area network.

16. A construction management system comprising:
the topographic information transmission device according to claim 1; and
the server device,
wherein the server device includes
a progress information creation unit that creates progress information indicating progress of construction in the construction site on the basis of the amount-reduced three-dimensional data received from the topographic information transmission device; and
a progress information transmission unit that transmits the progress information to an output device of a user via a wide area network.

17. A topographic information transmission method of transmitting three-dimensional data indicating a landform of a construction site to a server device by using a topographic information transmission device provided in the construction site, the topographic information transmission method comprising:
an information reception step of receiving a plurality of pieces of image data in which the landform of the construction site is captured;
a three-dimensional data creation step of creating three-dimensional data of the construction site on the basis of the plurality of pieces of image data;
an amount-reduction processing step of performing an amount reduction process of reducing a total data amount of the created three-dimensional data; and
a topographic information transmission step of transmitting amount-reduced three-dimensional data having undergone the amount reduction process to the server device.

18. The topographic information transmission method according to claim 17,
wherein, in the information reception step, the plurality of pieces of image data are received along with position/azimuth information of when each piece of image data is received, and
wherein, in the three-dimensional data creation step, a plurality of pieces of partial landform three-dimensional data which are pieces of three-dimensional data of landforms of portions included in respective pieces of image data in the entire construction site are created, and then the plurality of pieces of created partial landform three-dimensional data are joined together to be integrated into one on the basis of the position/azimuth information such that entire landform three-dimensional data is created.

* * * * *